United States Patent
Li et al.

(10) Patent No.: US 11,945,954 B2
(45) Date of Patent: Apr. 2, 2024

(54) METHOD FOR PREPARING HIGH-STABILITY LIQUID BLUEBERRY ANTHOCYANINS

(71) Applicant: SHENYANG AGRICULTURAL UNIVERSITY, Liaoning (CN)

(72) Inventors: Bin Li, Liaoning (CN); Bo Xue, Liaoning (CN); Ruihai Liu, Liaoning (CN); Xianjun Meng, Liaoning (CN); Ye Zhang, Liaoning (CN); Yuxi Lang, Liaoning (CN); Xulong Ran, Liaoning (CN); Xu Xie, Liaoning (CN); Zhihuan Zang, Liaoning (CN); Weisheng Wang, Liaoning (CN)

(73) Assignee: SHENYANG AGRICULTURAL UNIVERSITY, Liaoning (CN)

( * ) Notice: Subject to any disclaimer, the term of this patent is extended or adjusted under 35 U.S.C. 154(b) by 317 days.

(21) Appl. No.: 17/594,783

(22) PCT Filed: Jul. 19, 2019

(86) PCT No.: PCT/CN2019/096721
§ 371 (c)(1),
(2) Date: Jun. 13, 2022

(87) PCT Pub. No.: WO2020/220478
PCT Pub. Date: Nov. 5, 2020

(65) Prior Publication Data
US 2022/0298354 A1    Sep. 22, 2022

(30) Foreign Application Priority Data
Apr. 30, 2019 (CN) .......................... 201910365185.9

(51) Int. Cl.
*C09B 61/00* (2006.01)
*C09B 67/20* (2006.01)

(52) U.S. Cl.
CPC ............ *C09B 61/00* (2013.01); *C09B 67/006* (2013.01)

(58) Field of Classification Search
CPC ... C09B 61/00; C09B 67/006; C09B 67/0092; C09B 67/0091; C09B 67/0097
(Continued)

(56) References Cited

FOREIGN PATENT DOCUMENTS

| CN | 104496956 A | 4/2015 |
|---|---|---|
| CN | 104642534 A | 5/2015 |

(Continued)

*Primary Examiner* — Eisa B Elhilo
(74) *Attorney, Agent, or Firm* — NKL Law; Allen Xue

(57) ABSTRACT

The invention relates to a method for preparing high-stability liquid blueberry anthocyanins, belonging to the field of food processing. A method for preparing high-stability liquid blueberry anthocyanins comprises the following process steps: adding graphene oxide and chitosan to an MES buffer solution at room temperature, mixing homogeneously and adding EDC and NHS sequentially, reacting to obtain a first solution; adding dry blueberry anthocyanin powder in the first solution, adjusting pH to 4.5 to 5.0 and mixing homogeneously to obtain a second solution, and treating the second solution at 350 to 420 MPa and 2 to 4° C. to obtain the product. The method for increasing the stability of blueberry anthocyanins provided by the present invention uses dry blueberry anthocyanin powder as a raw material and adds graphene oxide combined with chitosan compound as an anthocyanin stabilizer, thereby increasing the stability of blueberry anthocyanins during processing and production.

9 Claims, 16 Drawing Sheets

(58) Field of Classification Search
USPC .............................................................. 8/646
See application file for complete search history.

(56) References Cited

FOREIGN PATENT DOCUMENTS

| CN | 104739921 A | * | 7/2015 | ............. A61K 47/48 |
| CN | 107674451 A | | 2/2018 | |
| KR | 101848400 B1 | | 4/2018 | |

* cited by examiner

METHOD FOR PREPARING HIGH-STABILITY LIQUID BLUEBERRY ANTHOCYANINS

TECHNICAL FIELD

The present disclosure relates to a method for preparing high-stability liquid blueberry anthocyanins, belonging to the field of food processing.

BACKGROUND

At present, most blueberry products only retain the flavor components of blueberries, while many of the nutritional components of blueberries are lost and not well retained, especially the anthocyanins, the main nutritional component in blueberries. Blueberry anthocyanins are the main natural functional pigments in blueberries. Studies have shown that blueberry anthocyanins have strong resistance to oxidation and many physiological functions, such as scavenging free radicals in the body, delaying aging, regulating blood lipid level, inhibiting cholesterol absorption, and eliminating eye fatigue. For a long time, anthocyanins component in blueberry deep-processing products are great lost during processing and storage due to the anthocyanins are easy to be thermally degraded and have poor stability, thereby reducing the nutritional value of the products. Blueberry functional products are a major development trend of blueberry in the future. However, most products in the market at present are blueberry flavor products, while there are few nutritional and health products about blueberry. The main reason is that blueberry anthocyanins are unstable and easy to be degraded. Therefore, it is necessary to research and develop a method to improve the stability of blueberry anthocyanins. The methods in the prior art to improve the stability of anthocyanins by molecular modification and copigmentation have the problems of reducing the color and activity of anthocyanins.

There are different types of molecular copigmentations, including intramolecular copigmentation, intermolecular copigmentation, metal ion complexation and self-polymerization action. The coloration mechanism of molecular copigmentation stabilizing anthocyanins is intermolecular or intramolecular interactions through hydrogen bond, complexation, covalent binding and the like. Intramolecular copigmentation is the color change caused by the interaction of anthocyanins intramolecular groups, which is mainly through the transformation of spatial structures such as rotation, folding and stacking of different groups in the molecule. The occurrence of intramolecular copigmentation is mainly related to the structure of anthocyanin molecule. Intramolecular copigmentations usually include intramolecular copigmentation of acylated structure, intramolecular copigmentation of glycosylated structure and intramolecular copigmentation of methylated structure. This method leads to the change of anthocyanin structure. Intermolecular copigmentation is the interaction between anthocyanin and copigment. The anthocyanin and copigment have a common molecular structure characteristic of a π plane structure rich in electrons. Metal ion complexation is the complexation between metal ions and anthocyanins. Self-polymerization action is realized through the stacking action of hydrogen bonds between aromatic chromophores and its bound sugars molecules. The change of molecular structure will inevitably affect the properties and physiological activities of anthocyanins in the molecular copimentation.

SUMMARY OF THE INVENTION

The purpose of the present disclosure is to provide a method for preparing high-stability liquid blueberry anthocyanins, which is a method to protect the stability of liquid blueberry anthocyanins. This method can greatly reduce the degradation rate of anthocyanins in the processing and storage of blueberry anthocyanins. The method has the advantages of simple process, simple operation, and is suitable for preparing blueberry products.

A method for preparing high-stability liquid blueberry anthocyanins, including the following processing steps:
  Step 1, adding graphene oxide and chitosan into an MES buffer solution at room temperature and mixing evenly, and adding EDC and NHS in it to react, obtaining a first solution;
  Step 2, adding dry blueberry anthocyanin powder in the first solution, adjusting pH to 4.5 to 5.0 and mixing evenly, obtaining a second solution; and
  Step 3, treating the second solution at 350 to 420 Mpa and 2 to 4° C. to obtain the product.

The first solution obtained in step 1 of the present disclosure is a solution of graphene oxide combined with chitosan compound. The second solution obtained in step 2 of the present disclosure is a mixed solution of blueberry anthocyanin and graphene oxide combined with chitosan compound. In the final product obtained in step 3, blueberry anthocyanins are absorbed on graphene oxide combined with chitosan compound, forming blueberry anthocyanin-graphene oxide-chitosan compound. The finally obtained liquid blueberry anthocyanin solution is blueberry anthocyanin-graphene oxide-chitosan compound solution.

The dry blueberry anthocyanin powder of the present disclosure can be commercially purchased, or prepared according to a method disclosed in the prior art.

In the method for preparing high-stability liquid blueberry anthocyanins of the present disclosure, the process steps involved in step 1 and step 2 are both performed at room temperature.

In the step 1 of the method for preparing high-stability liquid blueberry anthocyanins of the present disclosure, adding graphene oxide and chitosan into an IVIES buffer solution [2-(n-morpholine) ethanesulfonic acid buffer solution] at room temperature and mixing evenly, and adding EDC [1-(3-dimethylaminopropyl)-3-ethyl carbondiimide hydrochloride) and NHS (N-hydroxysuccinimide) in sequence to react under the conditions of room temperature, ultrasonic treating for 4 to 8 hours, stirring for 15 to 18 hours with a rotational speed of 700 to 1400 r/min.

The MES buffer solution in the present disclosure is an IVIES solution with pH of 5.5 to 6.0.

Further, in step 1, at room temperature, adding graphene oxide and chitosan into an IVIES buffer solution, ultrasonic treating for at least 1 hour and mixing evenly, then adding EDC and NHS in sequence to react under the conditions of room temperature, ultrasonic treating for 4 to 8 hours, stirring for 15 to 18 hours with a rotational speed of 700 to 1400 r/min.

The method for preparing high-stability liquid blueberry anthocyanins in the present disclosure, in step 1, a mass ratio of graphene oxide to chitosan ranges from 1:1 to 1:5.

The method for preparing high-stability liquid blueberry anthocyanins in the present disclosure, in step 1, a ratio of graphene oxide to MES buffer solution ranges from 0.1:100 mL to 0.3 g:100 mL. The method for preparing high-stability liquid blueberry anthocyanins in the present disclosure, in step 1, a mass ratio of graphene oxide to EDC ranges from 1:6 to 1:7, and preferred 1:6.5.

The method for preparing high-stability liquid blueberry anthocyanins in the present disclosure, in step 1, a mass ratio of graphene oxide to NHS ranges from 1:7 to 1:8, and preferred 1:7.8.

The method for preparing high-stability liquid blueberry anthocyanins in the present disclosure, in step 2, adding the dry blueberry anthocyanin powder into the first solution, ultrasonic treating for at least 30 minutes after adjusting pH to 4.5 to 5.0, stirring for 10 to 14 hours with a rotational speed of 700 to 1400 r/min to mix evenly, obtaining the second solution.

In the above technical solution, the pH value of the solution can be adjusted to 4.5 to 5.0 by using acidic or alkaline solutions, and a preferred acidic solution is hydrochloric acid with a concentration of 2 mol/L; and a preferred alkaline solution is sodium hydroxide solution with a concentration of 2 mol/L.

The stirring operations involved in the present disclosure are all operated in the stirring device provided by the prior art, and a preferred stirring device is a magnetic stirrer.

The method for preparing high-stability liquid blueberry anthocyanins in the present disclosure, a mass ratio of the dry blueberry anthocyanin powder to the first solution is 1:3 to 1:100, and preferred 1:50.

The method for preparing high-stability liquid blueberry anthocyanins in the present disclosure, in step 3, the second solution is treated for 8 to 15 minutes at conditions of 350 to 420 MPa and 2 to 4° C., obtaining the product.

The method of the present disclosure involves graphene oxide and chitosan. Graphene oxide introduces oxygen-containing groups, such as epoxy group, hydroxyl group, and carboxyl group and the like, into the graphene molecule, thereby has a two-dimensional planar structure with a larger surface area than the original graphene. Graphene oxide has a negative charge in water, which is conducive to the dispersion of its nanoparticles Graphene oxide has good dispersion and biocompatibility in water and other solvents, and can be used as a transport carrier. And in order to retain the blueberry anthocyanin content to the maximum extent and keep its structure unchanged, chitosan is also introduced in the present disclosure. Chitosan is a kind of alkaline polysaccharide with free amino groups in the molecule. Chitosan has good affinity and biocompatibility with organisms.

The beneficial effects of the present disclosure are as follows: the method to improve the stability of blueberry anthocyanins provided by the present disclosure takes dry blueberry anthocyanin powder as a raw material and adds graphene oxide combined with chitosan compound as an anthocyanin stabilizer to increase the stability of blueberry anthocyanins during processing and production. Chitosan has good biocompatibility. By adding chitosan, graphene oxide can play a better stabilizing effect. The graphene oxide and chitosan compound prepared by carboxyl activator of the present disclosure, due to the particularity of its structure, can be used as a carrier system, which can effectively solve the problem of poor stability of anthocyanins in traditional blueberry products during processing and storage. In addition, the use of non-thermal processing technology can make blueberry anthocyanins more closely combined with graphene oxide and chitosan compound, and can play the role of sterilization and prolonging the shelf life of blueberry products; the operation process is safe, hygienic, simple, low energy consumption and pollution-free.

DETAILED DESCRIPTION OF DRAWINGS

DETAILED DESCRIPTION OF PREFERRED EMODIMENTS

Figure 1:
FIG. 1 is a 1000× scanning electron microscopy image of graphene oxide.

The following non-limiting embodiments can enable those skilled in the art to understand the present disclosure more comprehensively, but do not limit the present disclosure in any way.

The methods in the following embodiments are conventional methods unless otherwise specified. Unless otherwise specified, the reagents and materials can be obtained commercially or prepared by conventional methods.

An implementation of the present disclosure is as follows:
A method for preparing high-stability liquid blueberry anthocyanins, including the following processing steps:
Step 1, at room temperature, adding graphene oxide and chitosan into an MES buffer solution (pH 5.5 to 6.0), ultrasonic treating for at least 1 hour and mixing evenly, then adding EDC and NHS in sequence to react under conditions of room temperature, ultrasonic treatment for 4 to 8 hours, stirring for 15 to 18 hours in a magnetic stirrer at a rotational speed of 700 to 1400 r/min, obtaining a first solution;
Step 2, adding dry blueberry anthocyanin powder in the first solution, ultrasonic treating for at least 30 minutes after adjusting pH to 4.5 to 5.0, and then stirring for 10 to 14 hours to evenly mix, obtaining a second solution; and
Step 3, treating the second solution under conditions of 350 to 420 MPa and 2 to 4° C. for 8 to 15 minutes, obtaining the product.

The dry blueberry anthocyanin powder in the present disclosure is further preferably prepared by the following method:

1. Gradient freezing: cleaning the picked fresh blueberries and placing them in a cold store at −35 to −30° C. for freezing 25 to 35 minutes, then transferring to a cold store at −25° C. for freezing 10 to 20 minutes, and finally transferring to a cold store at −18° C. for freezing until use.

2. Ultrahigh pressure unfreezing: placing the frozen blueberries in an automatic high hydrostatic pressure equipment to unfreeze at 180 to 225 MPa for 20 to 30 seconds.

3. Extraction of blueberry anthocyanins: putting the unfreezing blueberries directly into a beater for beating to get a pulp, evenly mixing the pulp and ethanol solution with a concentration of 60% at a pulp-ethanol solution ratio of 1:8-15 (a preferred ratio is 1:10 g/mL), lixiviating the mixture by ultrasonic at 40 to 45° C. for 1.5 to 2.5 hours, after filtering by a 200 mesh filter cloth, removing ethanol from the filter liquor by rotary evaporation at 32 to 36° C. in vacuum, and collecting the crude extract.

4. Filtration: refrigerating the crude extract at 4° C. for 24 hours, then centrifuging the crude extract at 4° C. and 4000 to 6000 r/min for 10 to 15 minutes, filtering the supernatant in vacuum, obtaining a filtrate.

5. Treating the resin: after soaking the new ADS-750 resin with anhydrous ethanol for more than 24 hours, washing the resin with distilled water until ethanol free, then soaking the resin with 5% hydrochloric acid for 4 to 6 hours and washing to neutral, and then soaking the resin with 2% sodium hydroxide solution for 4 to 6 hours and washing to neutral, and then placing the resin in a column.

6. Purification of blueberry anthocyanins by macroporous resin: adding the filtrate obtained in step 4 into the ADS-750 macroporous resin column obtained in step 5; after completely adding, washing the column with distilled water that five times the volume of the column, and then eluting the column with ethanol solution with a concentration of 60%, collecting the eluent and recycling the resin for standby, wherein the flow rate of adding filtrate is 1 mL/min, and the flow rate of distilled water is 5 mL/min.

7. Evaporation and freeze-drying: rotary evaporating the eluent obtained in step 6 until ethanol free, then placing the solution after evaporation in a culture dish and putting the culture dish into a vacuum freeze dryer for drying, collecting and sealing the dry powder; the vacuum dry conditions are follows: with the plate temperature of 38 to 42° C., drying in vacuum degree of 80 to 120° at room temperature of −42 to −35° C. for more than 24 hours.

In the following examples, the ADS-750 macroporous resin was treated as follows before use: the new ADS-750 resin was soaked in anhydrous ethanol for 24 hours and was washed with distilled water until ethanol free, then the resin was soaked with 5% hydrochloric acid for 5 hours and washed to neutral, and then the resin was soaked with 2% sodium hydroxide solution for 5 hours and washed to neutral.

In the following examples, the vacuum treatment conditions of the vacuum freeze drier were as follows: processing in vacuum degree of 100°, at the plate temperature of 40° C. and room temperature of −38° C. for 24 hours.

In the following embodiments, the XRD test was as follows: the X-ray diffraction pattern used a copper target, the incident wavelength was 0.154 nm, the scanning rate was 20/min, and the sample test range was 350 to 500.

Example 1

A method for preparing high-stability liquid blueberry anthocyanins, the picked fresh blueberries were cleaned and placed in a cold store at −30° C. for freezing 25 minutes, then were transferred to a cold store at −25° C. for freezing 20 minutes, and finally were transferred to a cold store at −18° C. for freezing. When using, 5 kg of frozen blueberries were placed in an automatic high hydrostatic pressure equipment to unfreeze at 200 MPa for 25 seconds. The unfreezing blueberries were directly put into a beater for beating to get a pulp, and the pulp was mixed evenly with 60% of ethanol solution at a ratio of pulp to ethanol solution of 1:10. The mixture was lixiviated by ultrasonic at 40° C. for 2 hours, then was filtered through a 200 mesh filter cloth. The filter liquor was treated by rotary evaporation at 36° C. in vacuum until ethanol free. The crude extract was collected and refrigerated at 4° C. for 24 hours, then the crude extract was centrifuged at 4° C. and 5000 r/m for 15 minutes to get supernatant and the supernatant was filtered in vacuum to obtain the filtrate. The filtrate, as sample, was added to pass through the ADS-750 macroporous resin column at a flow rate of 1 mL/min. After the sample was completely added, the column was washed with distilled water that five times the volume of the column at 5 mL/min, and was eluted with 60% ethanol solution. The eluent was collected and rotary evaporated until ethanol free, and then was placed in a culture dish and freeze-dried in a vacuum freeze dryer. The dry powder was collected and sealed for standby in cold storage. 0.1 g of graphene oxide and 0.4 g of chitosan were added to 50 mL of IVIES buffer solution (pH 5.5 to 6.0) for 1 hour of ultrasonic treatment. 0.652 g of EDC and 0.782 g of NHS were added to the solution in sequence and ultrasonic treatment for 6 hours at room temperature. And then the solution was stirred for 16 hours in a magnetic stirrer at a rotational speed of 1000 r/min, and the graphene oxide combined with chitosan compound solution was obtained. 1 g of blueberry anthocyanin dry powder was added into the said graphene oxide combined with chitosan compound solution and pH was adjusted to 4.5, then was ultrasonic treated for 30 minutes and stirred for 12 hours in a magnetic stirrer at a rotational speed of 1000 r/min to prepare the mixed solution of graphene oxide combined with chitosan compound and blueberry anthocyanins. The mixed solution of graphene oxide combined with chitosan compound and blueberry anthocyanins was treated at 400 MPa for 10 minutes to obtain the blueberry anthocyanin-graphene oxide-chitosan compound solution, which was sealed storage.

Example 2

A method for preparing high-stability liquid blueberry anthocyanins, the picked fresh blueberries were cleaned and placed in a cold store at −30° C. for freezing 30 minutes, then were transferred to a cold store at −25° C. for freezing 20 minutes, and finally were transferred to a cold store at −18° C. for freezing. When using, 5 kg of frozen blueberries were placed in an automatic high hydrostatic pressure equipment to unfreeze at 200 MPa for 25 seconds. The unfreezing blueberries were directly put into a beater for beating to get a pulp, and the pulp was mixed with 60% of ethanol solution at a ratio of pulp to ethanol solution of 1:8. The mixture was lixiviated by ultrasonic at 45° C. for 1.5 hours, then was filtered through a 200 mesh filter cloth. The filter liquor was treated by rotary evaporation at 34° C. in vacuum until ethanol free. The crude extract was collected and refrigerated at 4° C. for 24 hours, then the crude extract was centrifuged at 4° C. and 4000 r/m for 13 minutes to get supernatant and the supernatant was filtered in vacuum to obtain the filtrate. The filtrate, as sample, was added to pass through the ADS-750 macroporous resin column at a flow rate of 1 mL/min. After the sample was completely added, the column was washed with distilled water that five times the volume of the column at 5 mL/min, and was eluted with 60% of ethanol solution. The eluent was collected and rotary evaporated until ethanol free, and then was placed in a culture dish and freeze-dried in a vacuum freezer dryer. The dry powder was collected and sealed for standby in cold storage.

0.1 g of graphene oxide and 0.5 g of chitosan were added to 50 mL of MES buffer solution (pH 5.5 to 6.0) for 1 hour of ultrasonic treatment. 0.652 g of EDC and 0.782 g of NHS were added to the solution in sequence and ultrasonic treatment for 7 hours at room temperature. And then the solution was stirred for 17 hours in a magnetic stirrer at a rotational speed of 700 r/min, and the graphene oxide combined with chitosan compound solution was obtained. 0.3 g of blueberry anthocyanin dry powder was added into the said graphene oxide combined with chitosan compound solution and pH was adjusted to 4.5, then was ultrasonic treated for 30 minutes and stirred for 10 hours in a magnetic stirrer at a rotational speed of 700 r/min to prepare the mixed solution of graphene oxide combined with compound and blueberry anthocyanins. The mixed solution of graphene oxide combined with chitosan compound and blueberry anthocyanins was treated at 400 MPa for 10 minutes to obtain the blueberry anthocyanin-graphene oxide-chitosan compound solution, which was sealed storage.

Example 3

A method for preparing high-stability liquid blueberry anthocyanins, the picked fresh blueberries were cleaned and placed in a cold store at −30° C. for freezing 35 minutes, then were transferred to a cold store at −25° C. for freezing 20 minutes, and finally were transferred to a cold store at −18° C. for freezing. When using, 5 kg of frozen blueberries were placed in an automatic high hydrostatic pressure equipment to unfreeze at 200 MPa for 25 seconds. The unfreezing blueberries were directly put into a beater for beating to get a pulp, and the pulp was mixed evenly with 60% of ethanol solution at a ratio of pulp to ethanol solution of 1:9. The mixture was lixiviated by ultrasonic at 50° C. for 2.5 hours, then was filtered through a 200 mesh filter cloth. The filter liquor was treated by rotary evaporation at 36° C. in vacuum until ethanol free. The crude extract was collected and refrigerated at 4° C. for 24 hours. The crude extract was centrifuged at 4° C. and 6000 r/m for 10 minutes to get the supernatant, and the supernatant was filtered in vacuum to obtain the filtrate. The filtrate, as sample, was added to pass though the ADS-750 macroporous resin column at a flow rate of 1 mL/min. After the sample was completely added, the column was washed with distilled water that five times the volume of the column at 5 mL/min, and was eluted with 60% ethanol solution. The eluent was collected and rotary evaporated until ethanol free, and then was placed in a culture dish and freeze-dried in a vacuum freezer dryer. The dry powder was collected and sealed for standby in cold storage.

0.2 g of graphene oxide and 0.8 g of chitosan were added to 100 mL of IVIES buffer solution (pH 5.5 to 6.0) for 1 hour of ultrasonic treatment. 1.304 g of EDC and 1.564 g of NHS were added to the solution in sequency and ultrasonic treatment for 5 hours at room temperature. And then the solution was stirred for 15 hours in a magnetic stirrer at a rotational speed of 1400 r/min, the graphene oxide combined with chitosan compound solution was obtained. 1.5 g of blueberry anthocyanin dry powder was added into the said graphene oxide combined with chitosan compound solution and pH was adjusted to 4.5, then was ultrasonic treated for 30 minutes and stirred for 14 hours in a magnetic stirrer at a rotational speed of 1400 r/min to prepare the mixed solution of graphene oxide combined with chitosan compound and blueberry anthocyanins. The mixed solution of graphene oxide combined with chitosan compound and blueberry anthocyanins was treated at 400 MPa for 10 minutes to obtain the blueberry anthocyanin-graphene oxide-chitosan compound solution, which was sealed storage.

The Test Results are as Follows:

The blueberry anthocyanin-graphene oxide-chitosan compound solution obtained in example 1 was used for the following tests. The blueberry anthocyanin-graphene oxide-chitosan compound solution with a mass concentration of 1 mg/mL (calculated by blueberry anthocyanins in the solution) was prepared as follows: the blueberry anthocyanin-graphene oxide-chitosan compoundsolution finally obtained in example 1 was diluted with water and the pH was adjusted to 4.5 with 2 mol/L of hydrochloric acid to obtain a solution with a concentration of blueberry anthocyanins of 1 mg/mL.

Figure 2:
FIG. 2 is a 2000× scanning electron microscopy image of graphene oxide.
Figure 3:
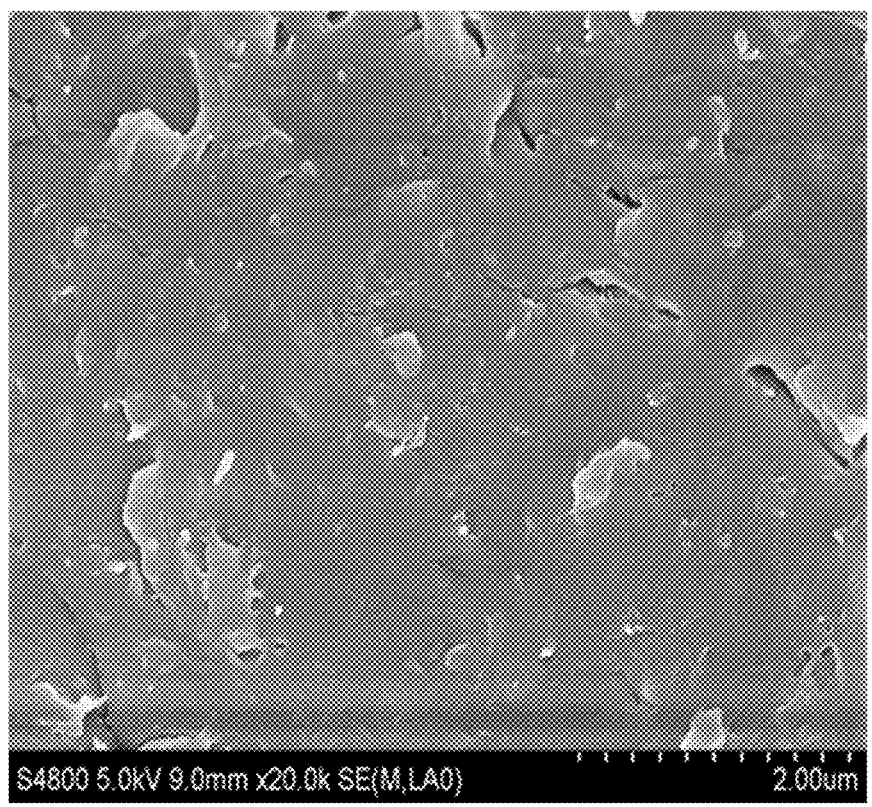
FIG. 3 is a 2000× scanning electron microscopy image of chitosan.
Figure 4:
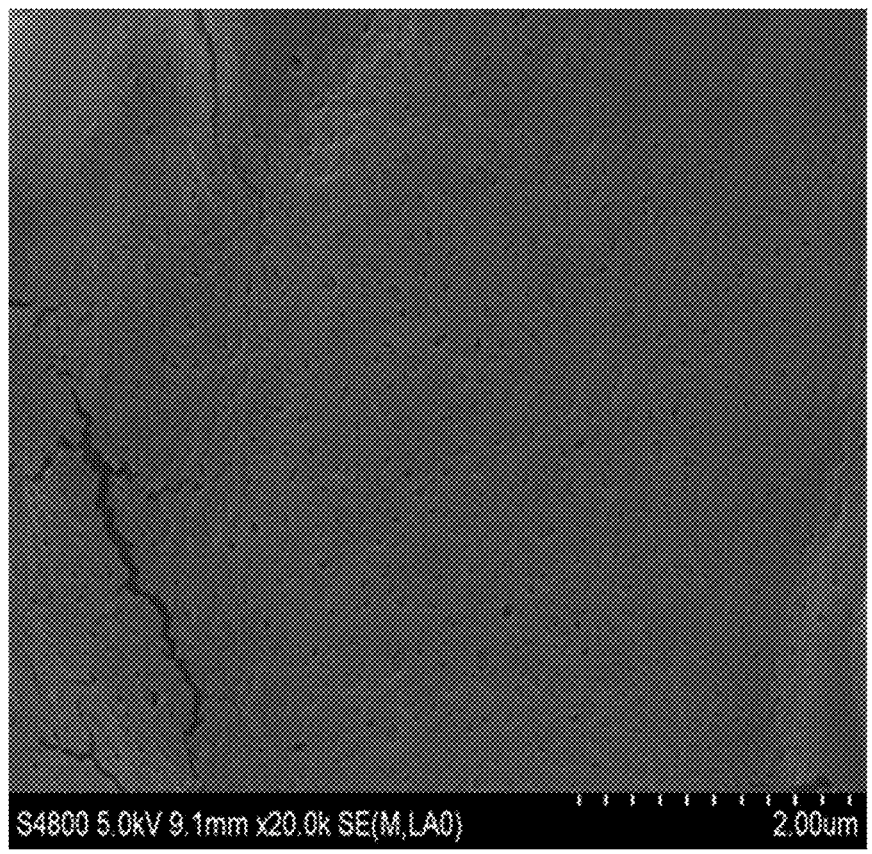
FIG. 4 is a 1000× scanning electron microscopy image of graphene oxide combined with chitosan compound.

I. Scanning Electron Microscopy Image of Graphene Oxide, Chitosan and their Compound FIG. 1 is a 1000× scanning electron microscopy image of graphene oxide. FIG. 2 is a 2000× scanning electron microscopy image of graphene oxide. FIG. 3 is a 2000× scanning electron microscopy image of chitosan, showing that the surface of pure chitosan is relatively smooth. FIG. 4 is a 1000× scanning electron microscopy image of graphene oxide combined with chitosan compound; it can be seen from the figure that the graphene oxide combined with chitosan compound is relatively flat, but a few flake particles are distributed on the surface. The presence of a large number of oxygen-containing groups on graphene oxide increases the hydrophilicity of graphene oxide and enables it to exist stably in aqueous solutions. These oxygen-containing groups can form hydrogen bonds with the amino and carboxyl groups on chitosan, while the chitosan blocks the agglomeration of graphene oxide. The results show that graphene oxide does not agglomerate in chitosan groups, indicating better compatibility between the two.

II. X-Ray Diffraction Spectrum of Graphene Oxide, Chitosan and their Compound

Figure 5:
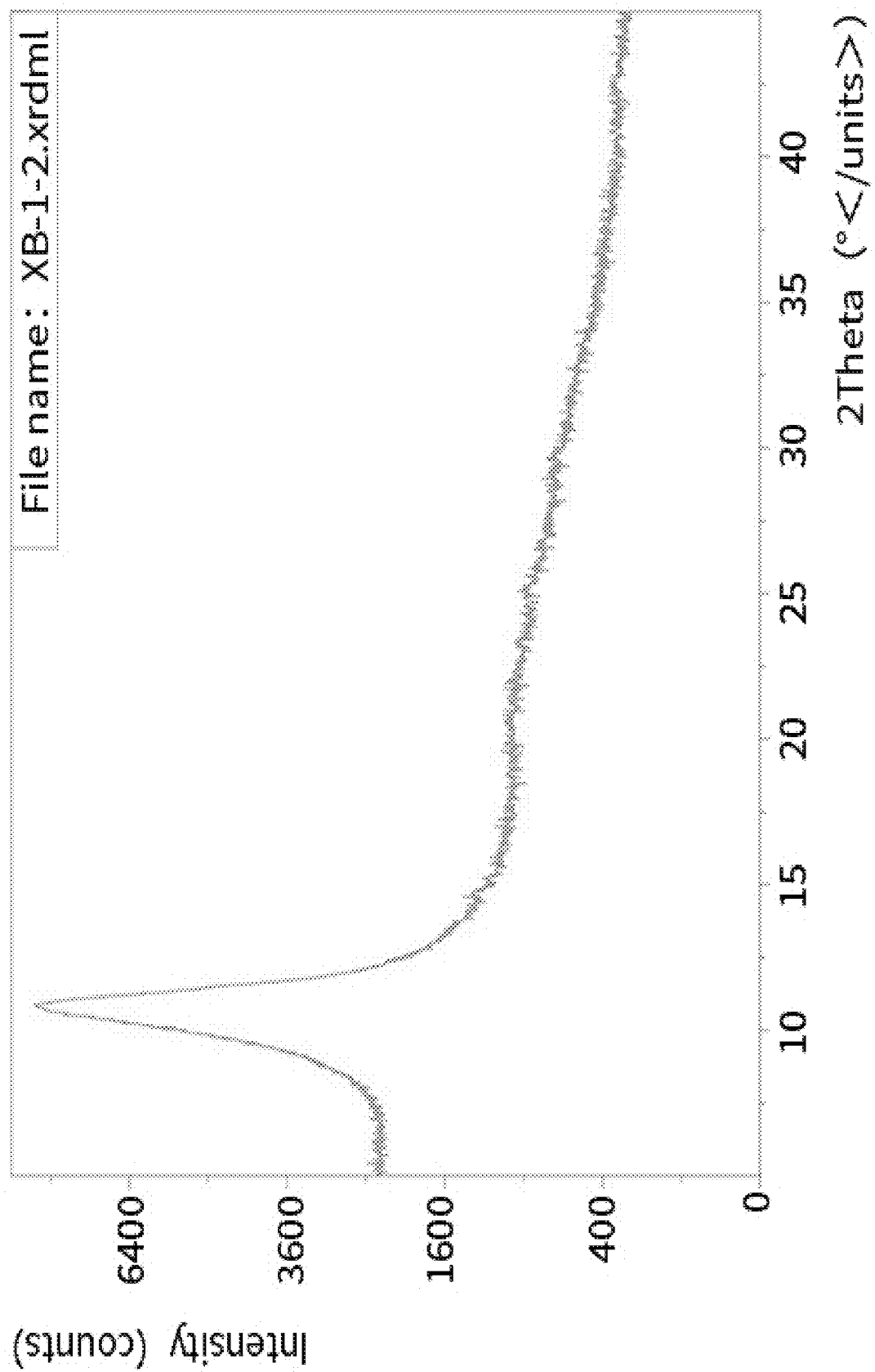
FIG. 5 is an X-ray diffraction spectrum of dry graphene oxide.
Figure 6:
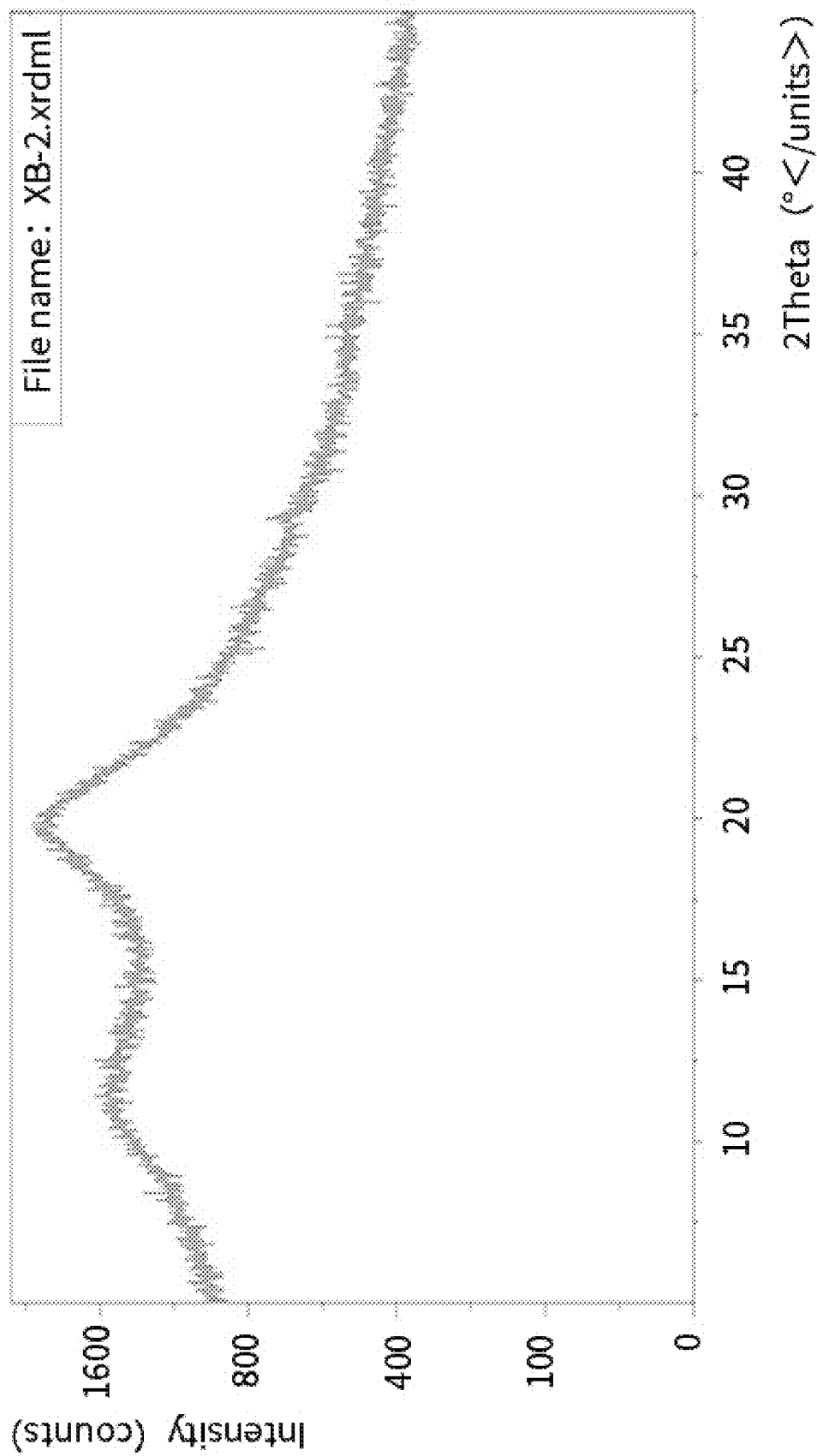
FIG. 6 is an X-ray diffraction spectrum of chitosan.
Figure 7:
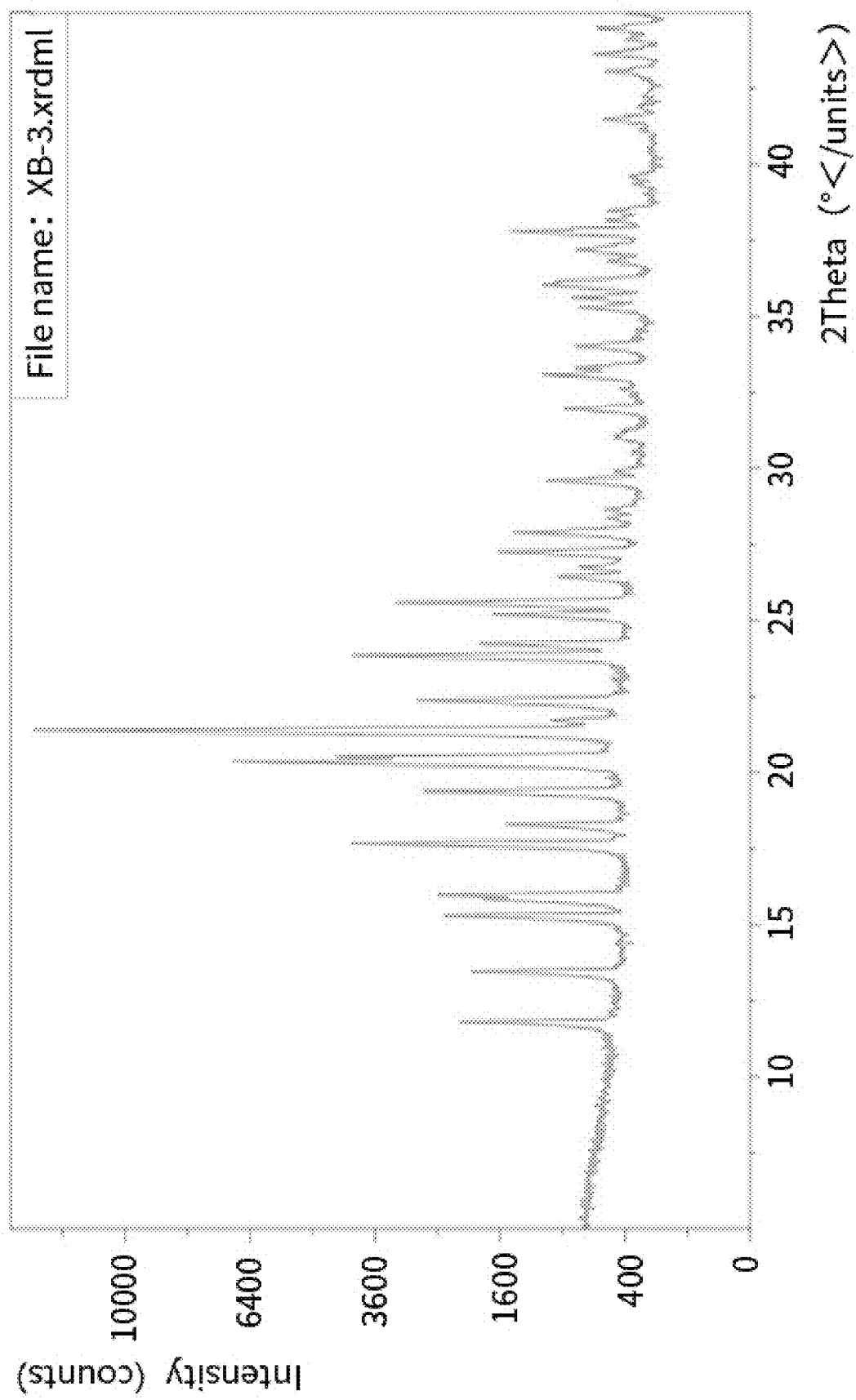
FIG. 7 is an X-ray diffraction spectrum of graphene oxide combined with chitosan compound.
Figure 8:
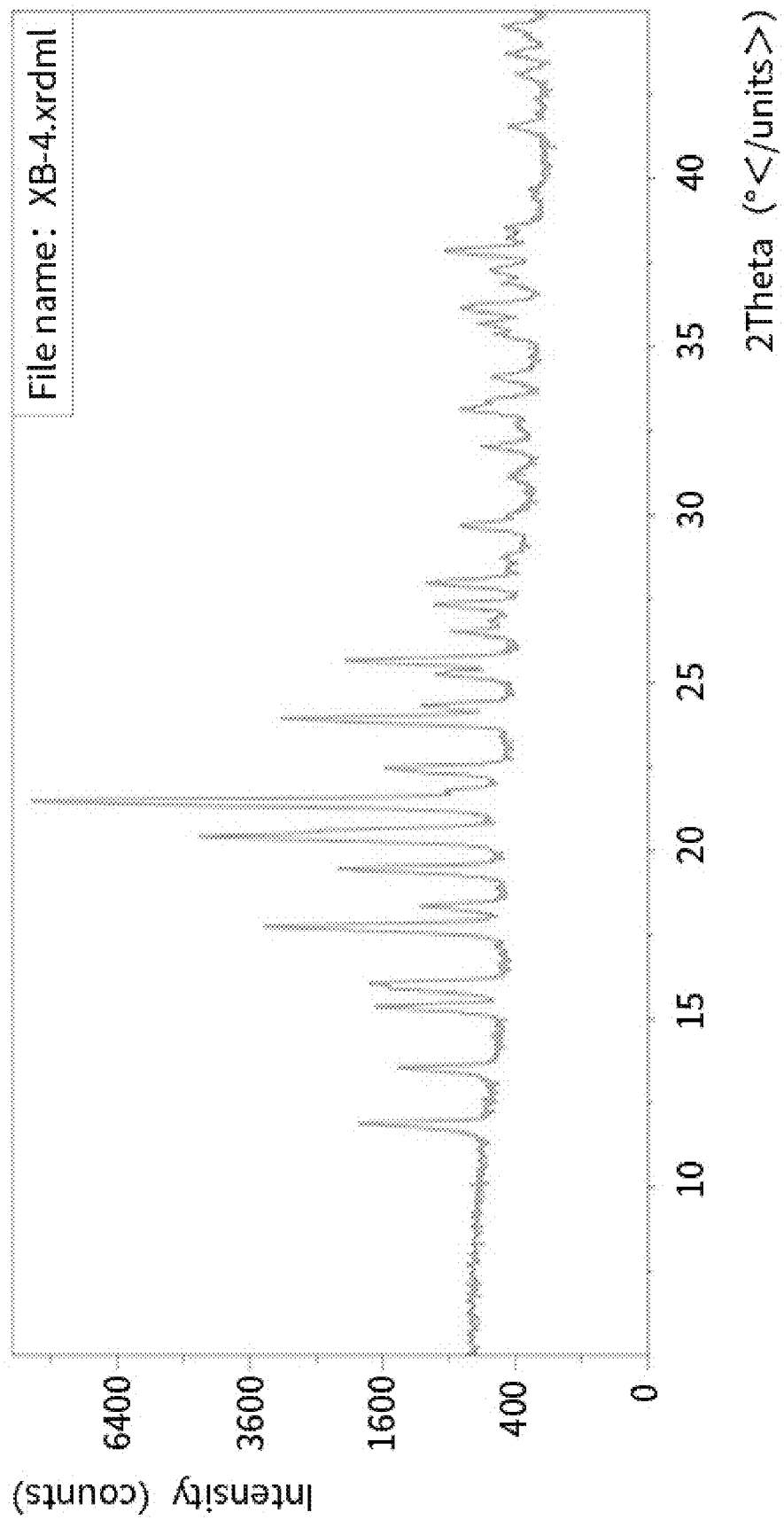
FIG. 8 is an X-ray diffraction spectrum of blueberry anthocyanin-graphene oxide-chitosan compound.

FIG. 5 is an X-ray diffraction spectrum of dry graphene oxide. It can be seen from the figure that graphene oxide has a characteristic peak at 10.860 with higher intensity and sharp. According to the Bragg equation of $2d \sin \theta = \lambda$, the interlayer spacing of graphene oxide is calculated to be 0.41 nm. FIG. 6 is an X-ray diffraction spectrum of chitosan. FIG. 7 is an X-ray diffraction spectrum of graphene oxide combined with chitosan compound. FIG. 8 is an X-ray diffraction spectrum of blueberry anthocyanin-graphene oxide-chitosan compound. It can be seen from FIGS. 7 and 8 that the characteristic peak of graphene oxide disappears near 10, indicating that the graphene oxide has no effect on the crystal structure and crystallization evolution of chitosan. FIG. 7 illustrates that graphene oxide is dispersed in chitosan matrix in lamella without agglomeration, and this single lamella dispersion increases the interaction between graphene oxide and chitosan.

Figure 9:
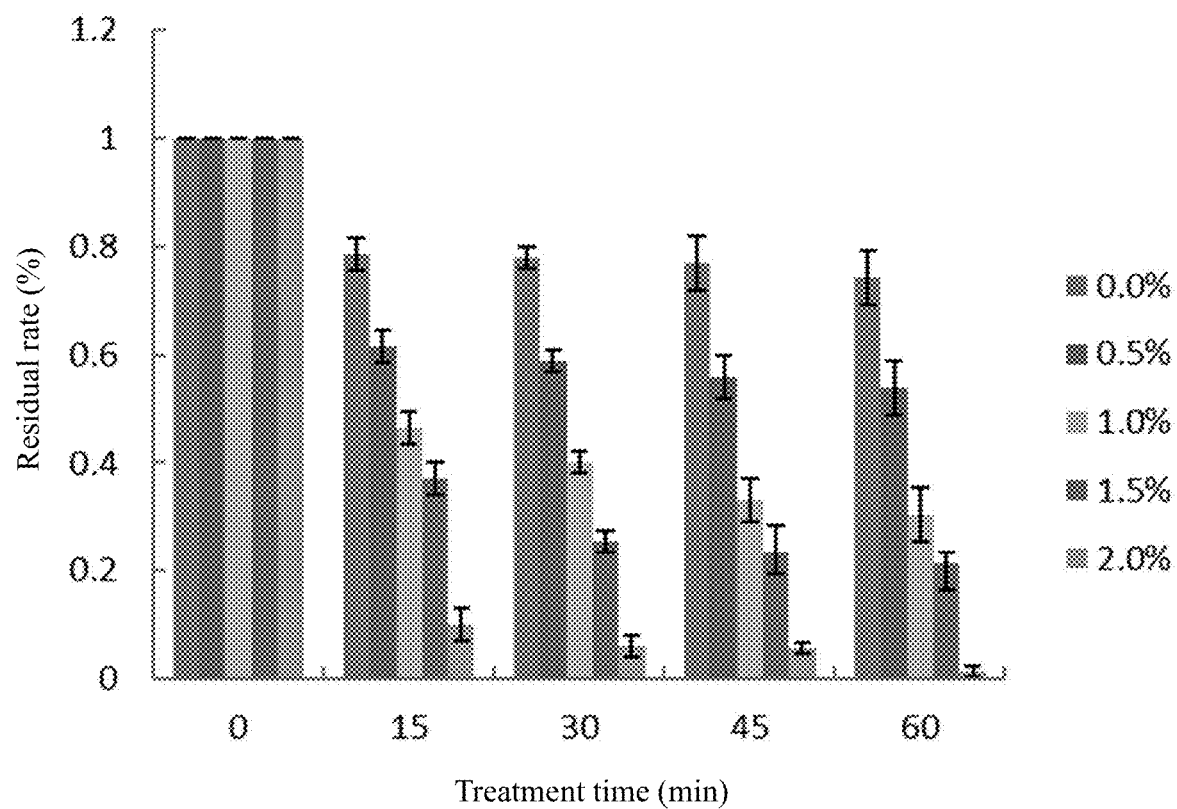
FIG. 9 shows the effect of $H_2O_2$ on the blueberry anthocyanin residual rate.
Figure 10:
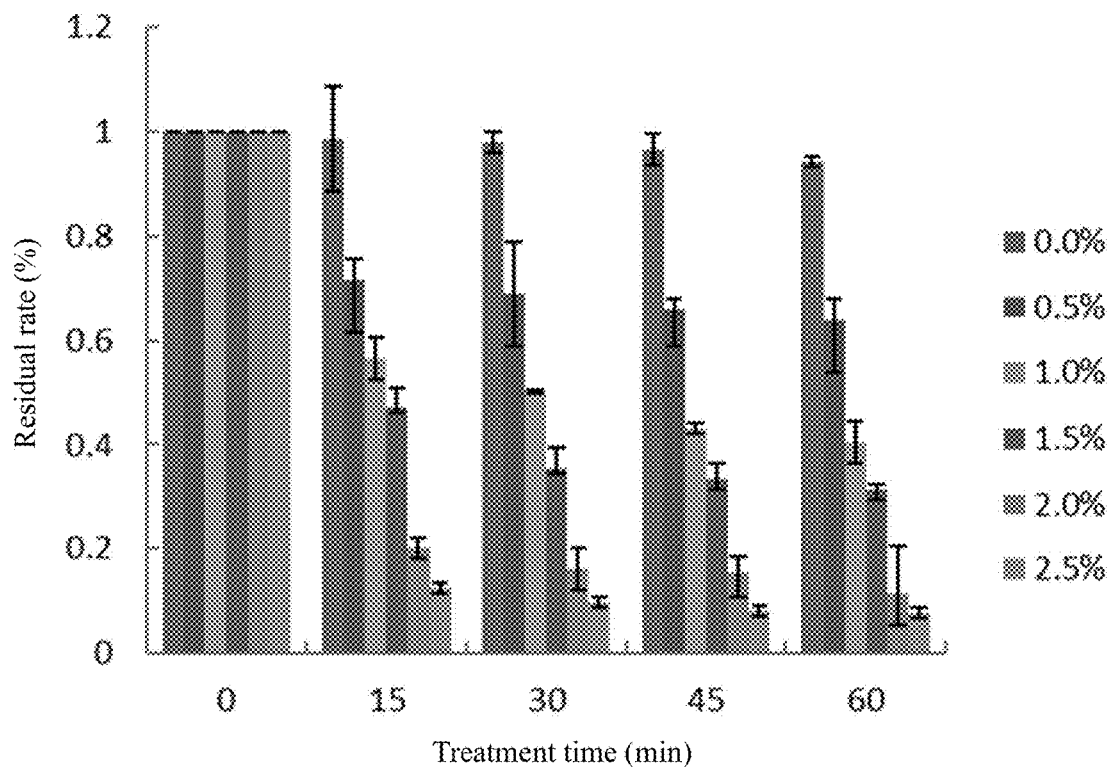
FIG. 10 shows the effect of $H_2O_2$ on the blueberry anthocyanin residual rate in blueberry anthocyanin-graphene oxide-chitosan compound.

III. Study on the Stability of Blueberry Anthocyanins and its Compound by Hydrogen Peroxide A blueberry anthocyanin solution with a mass concentration of 1 mg/mL and a blueberry anthocyanin-graphene oxide-chitosan compound solution with a mass concentration of 1 mg/mL were prepared. Hydrogen peroxide was added into the solutions respectively, and the volume fractions of hydrogen peroxide in the solution were 0.0%, 0.05%, 1.0%, 1.5%, 2.0% and 2.5% respectively. Each mixed solution was treated at room temperature for 1 hour away from light, and samples were taken every 15 minutes to determine the content of anthocyanins. The results are as shown in FIGS. 9 and 10. After treatment with hydrogen peroxide, the content of anthocyanins in the blueberry anthocyanin-graphene oxide-chitosan compound is significantly higher than that in the blueberry anthocyanin solution. When the volume fraction of oxidizing agent $H_2O_2$ is 2.5%, the content of blueberry anthocyanins could not be determined in the blueberry anthocyanin solution. However, the residual rate of anthocyanins in the compound reaches 7.69%.

IV. Study on the Stability of Blueberry Anthocyanins and the Compound by Light

Figure 11:
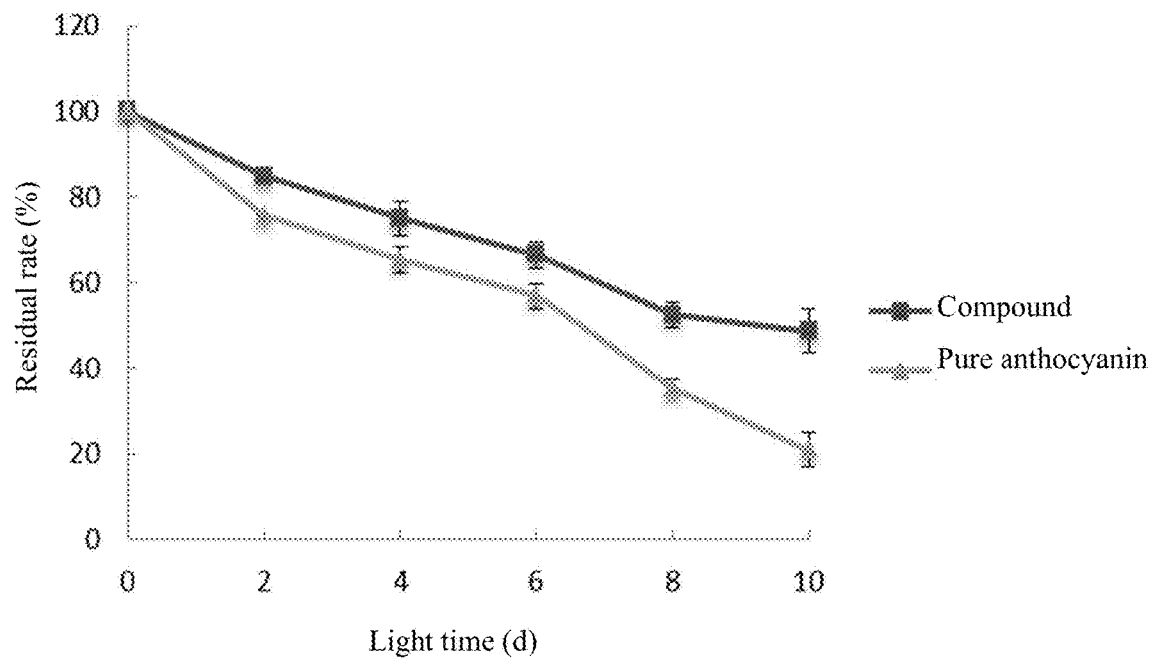
FIG. 11 shows the effect of light on the residual rates of blueberry anthocyaninin and pure blueberry anthocyanin in blueberry anthocyanin-graphene oxide-chitosan compound.
Figure 12:
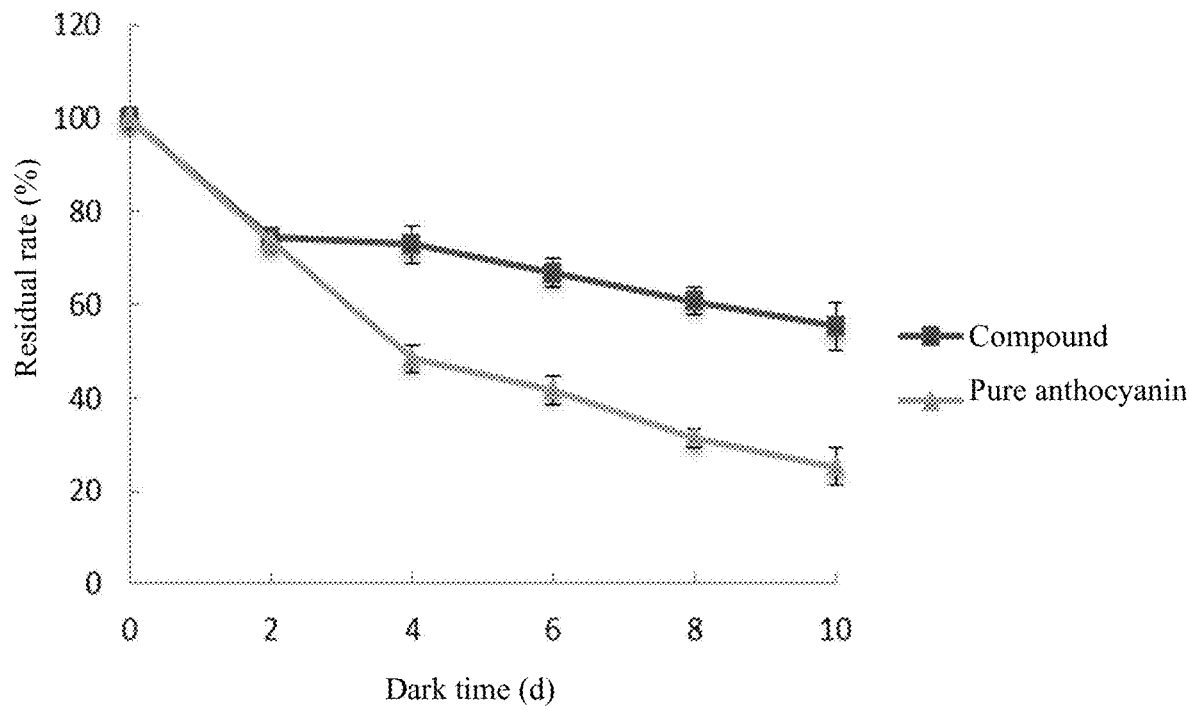
FIG. 12 shows the effect of light on the residual rates of blueberry anthocyaninin and pure blueberry anthocyanin in blueberry anthocyanin-graphene oxide-chitosan compound.
Figure 13:
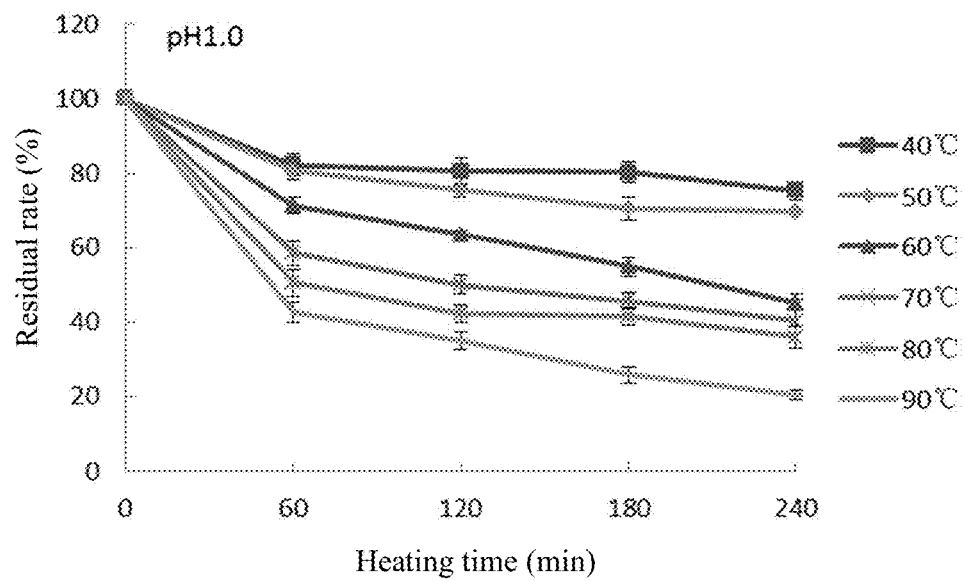
FIG. 13 shows the changes of the blueberry anthocyanin residual rate of pH 1.0 blueberry anthocyanins heated at different temperatures for 4 hours.
Figure 14:
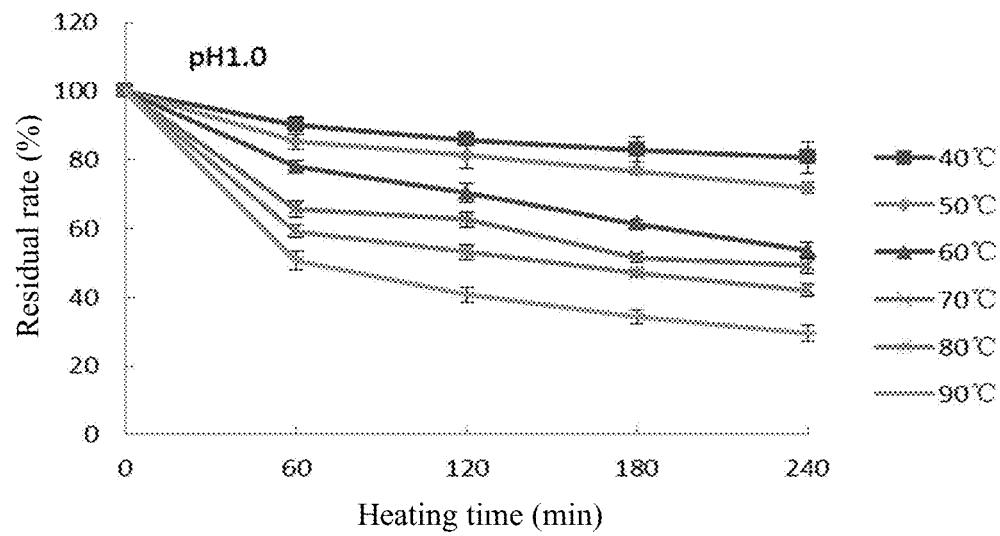
FIG. 14 shows the changes of the anthocyanin residual rate of pH 1.0 blueberry anthocyanin-graphene oxide-chitosan compound heated at different temperatures for 4 hours.
Figure 15:
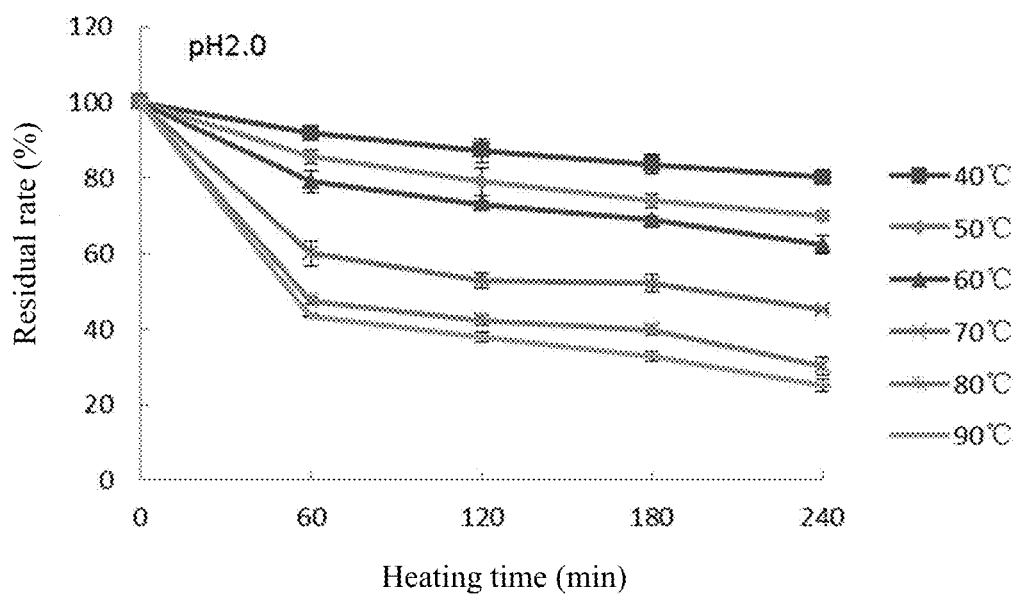
FIG. 15 shows the changes of the anthocyanin residual rate of pH 2.0 blueberry anthocyanins heated at different temperatures for 4 hours.
Figure 16:
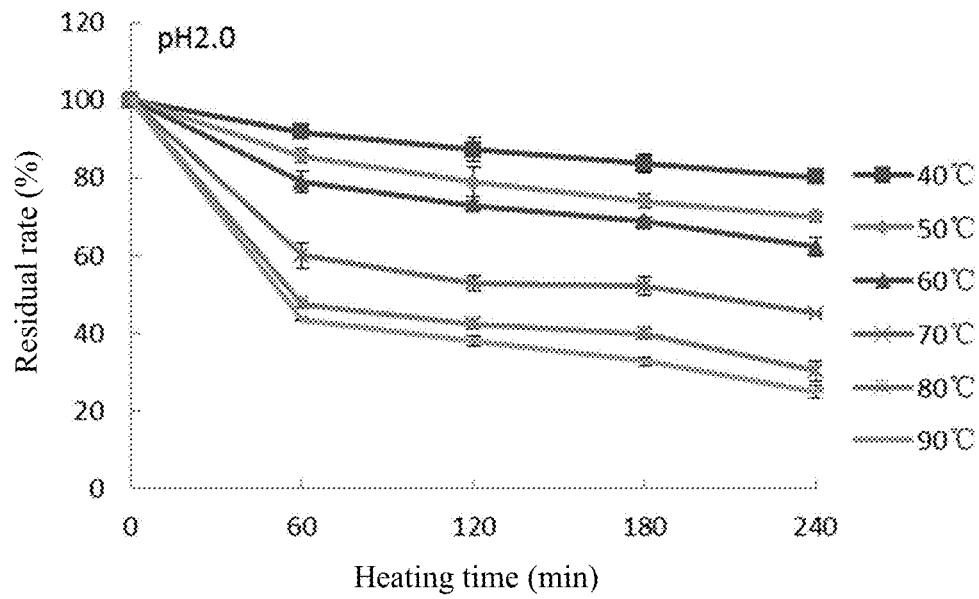
FIG. 16 shows the changes of the anthocyanin residual rate of pH 2.0 blueberry anthocyanin-graphene oxide-chitosan compound heated at different temperatures for 4 hours.
Figure 17:
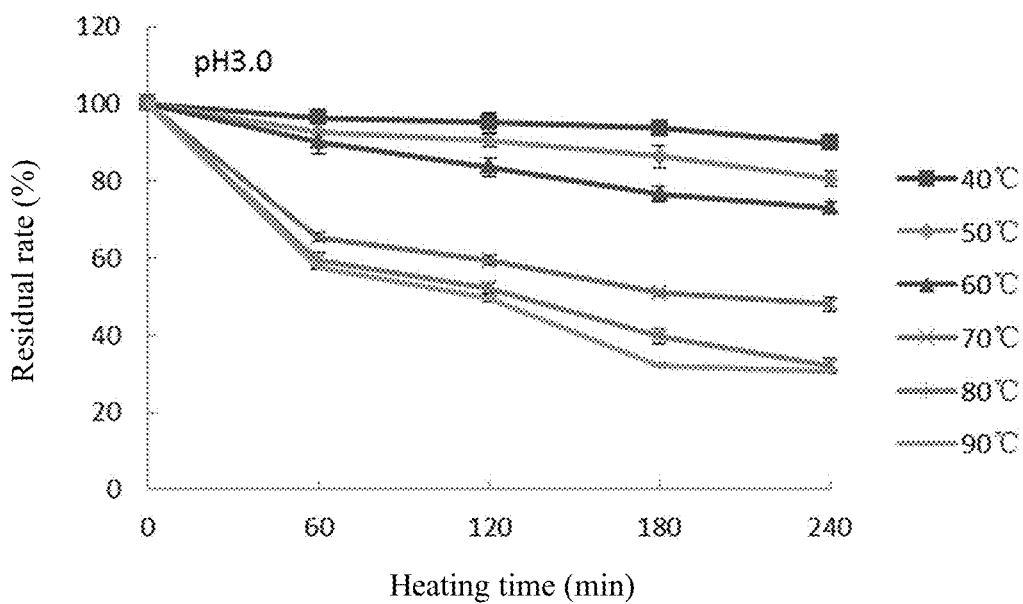
FIG. 17 shows the changes of the anthocyanin residual rate of pH 3.0 blueberry anthocyanins heated at different temperatures for 4 hours.
Figure 18:
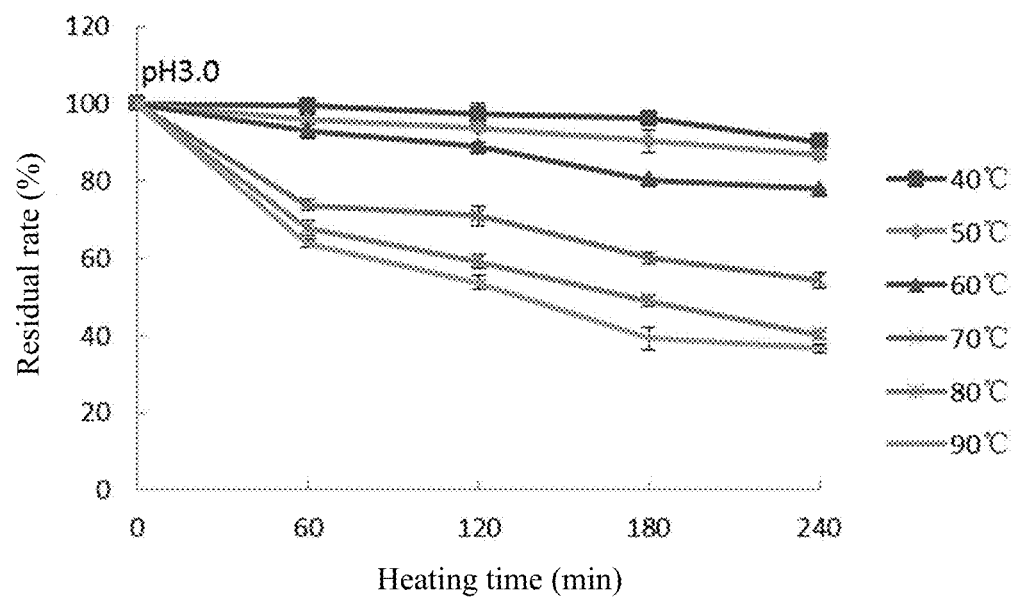
FIG. 18 shows the changes of the anthocyanin residual rate of pH 3.0 blueberry anthocyanin-graphene oxide-chitosan compound heated at different temperatures for 4 hours.
Figure 19:
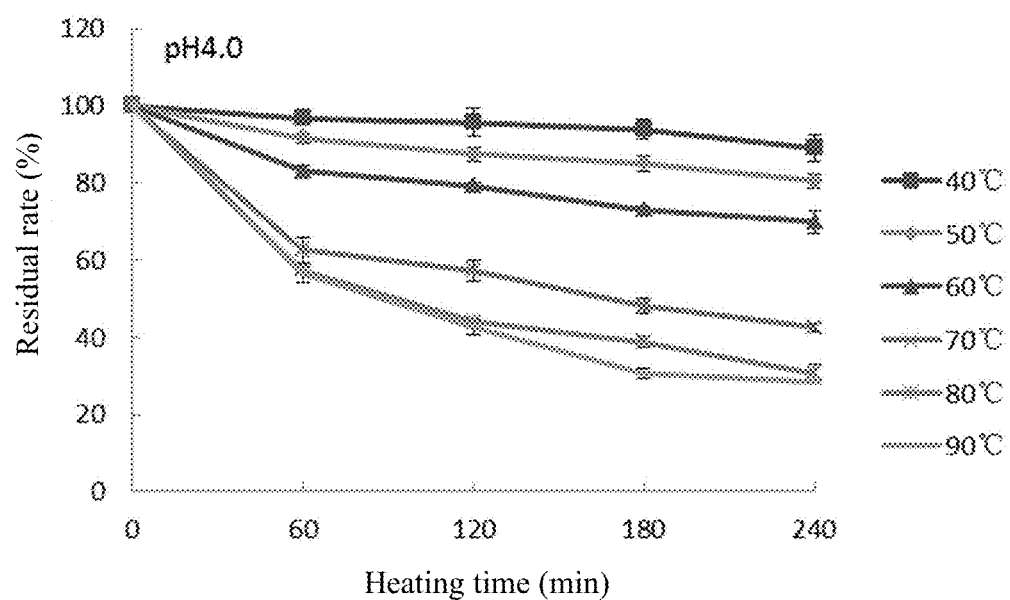
FIG. 19 shows the changes of the anthocyanin residual rate of pH 4.0 blueberry anthocyanins heated at different temperatures for 4 hours.
Figure 20:
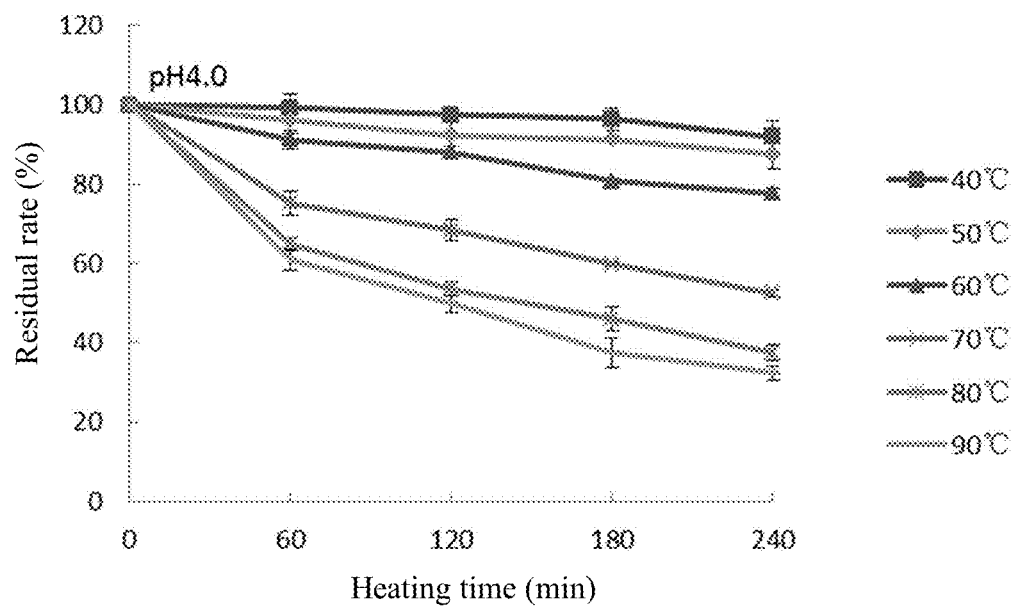
FIG. 20 shows the changes of the anthocyanin residual rate of pH 4.0 blueberry anthocyanin-graphene oxide-chitosan compound heated at different temperatures for 4 hours.
Figure 21:
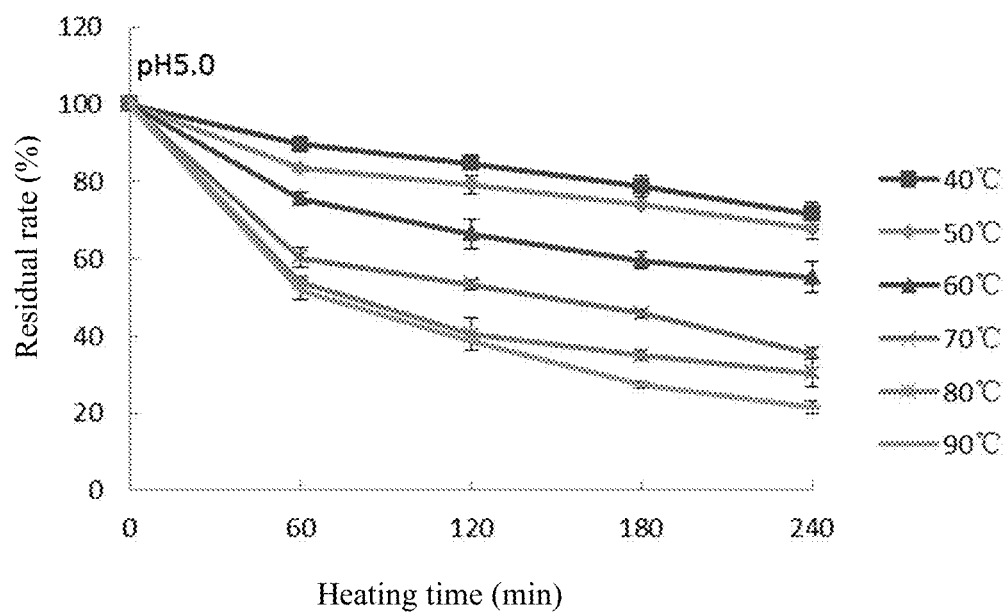
FIG. 21 shows the changes of the anthocyanin residual rate of pH 5.0 blueberry anthocyanins heated at different temperatures for 4 hours.
Figure 22:
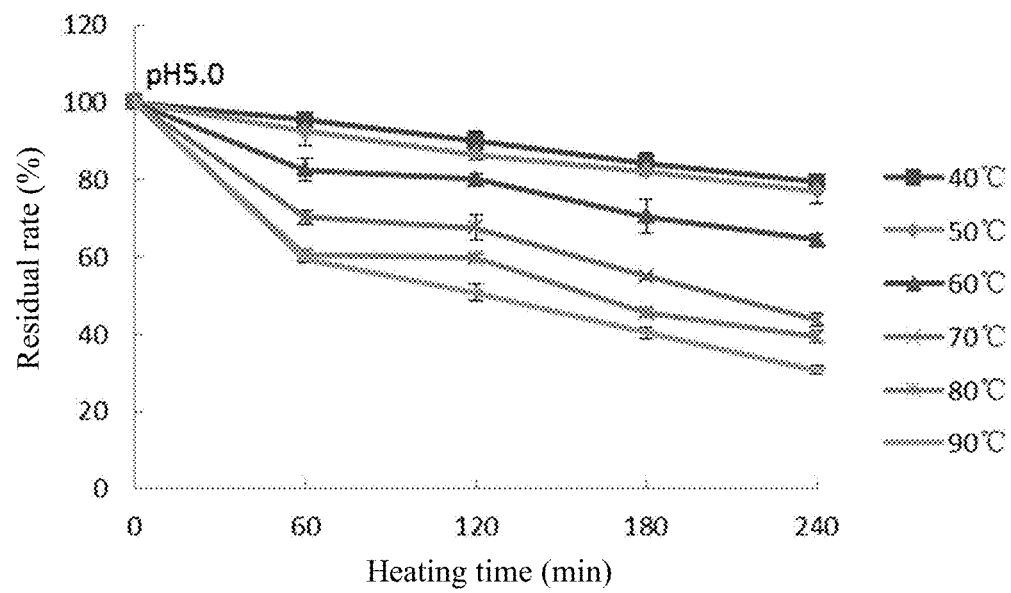
FIG. 22 shows the changes of the anthocyanin residual rate of pH 5.0 blueberry anthocyanin-graphene oxide-chitosan compound heated at different temperatures for 4 hours.
Figure 23:
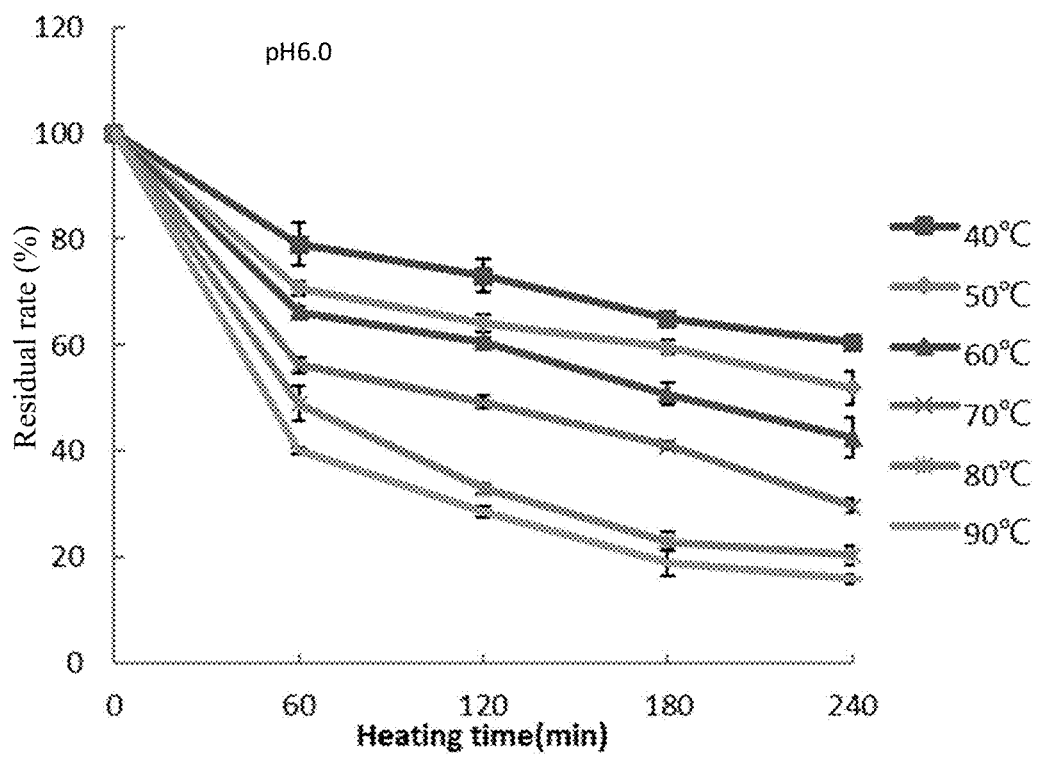
FIG. 23 shows the changes of the anthocyanin residual rate of pH 6.0 blueberry anthocyanins heated at different temperatures for 4 hours.
Figure 24:
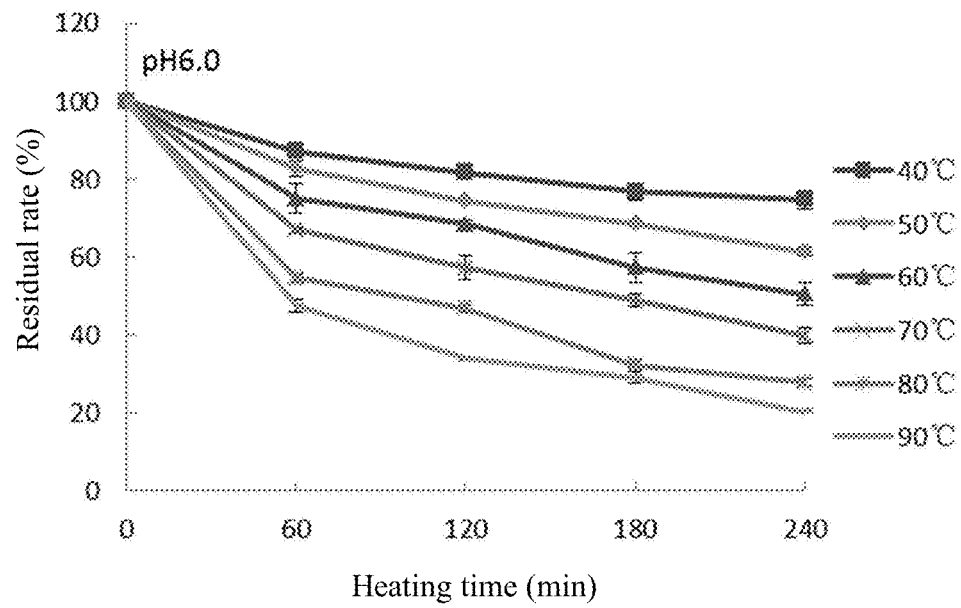
FIG. 24 shows the changes of the anthocyanin residual rate of pH 6.0 blueberry anthocyanin-graphene oxide-chitosan compound heated at different temperatures for 4 hours.
Figure 25:
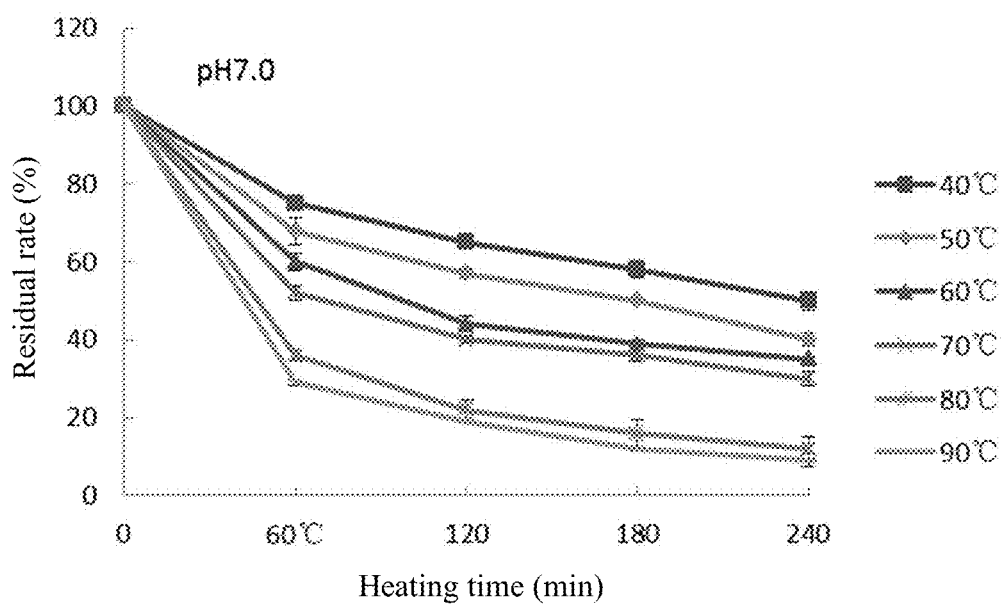
FIG. 25 shows the changes of the anthocyanin residual rate of pH 7.0 blueberry anthocyanins heated at different temperatures for 4 hours.
Figure 26:
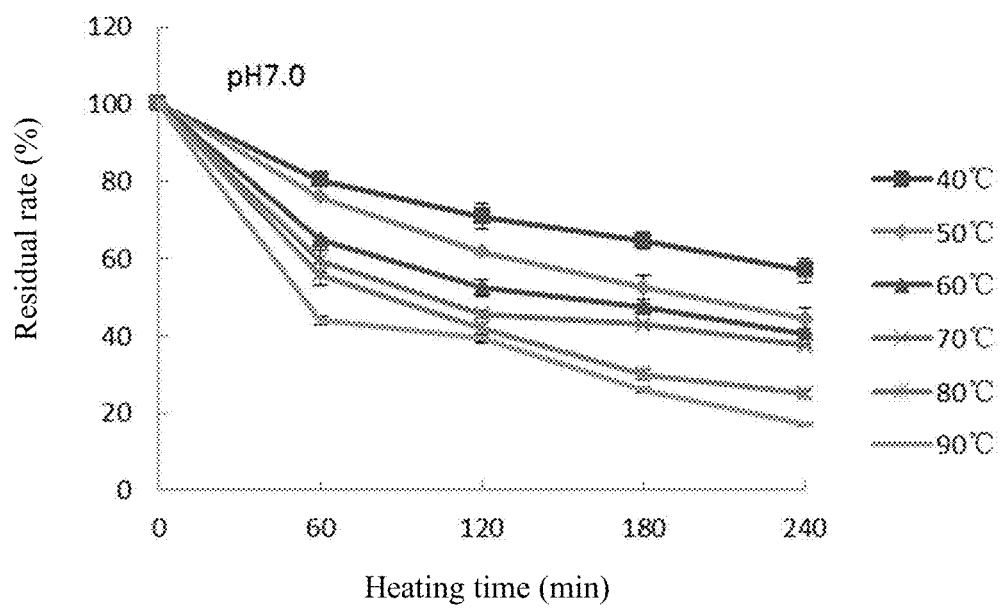
FIG. 26 shows the changes of the anthocyanin residual rate of pH 7.0 blueberry anthocyanin-graphene oxide-chitosan compound heated at different temperatures for 4 hours.

A blueberry anthocyanin solution with a mass concentration of 1 mg/mL and a blueberry anthocyanin-graphene oxide-chitosan compound solution with a mass concentration of 1 mg/mL were prepared. The blueberry anthocyanin solution and the blueberry anthocyanin-graphene oxide-chitosan compound solution were both placed in a light box with a light intensity of 70001× and a dark box, for light and dark treatments for 10 days at 24° C. The samples were taken every two days to determine the content of anthocyanins in the two groups. The results are shown in FIGS. 11 and 12. After light and dark treatments, the content of anthocyanins in the blueberry anthocyanin-graphene oxide-chitosan compound is significantly higher than that in the blueberry anthocyanin solution. With the extension of light and dark time, the content of anthocyanins decreases gradually. The residual rate of anthocyanins in the blueberry anthocyanin-graphene oxide-chitosan compound solution in light treatment is about 14.74% higher than that in the pure blueberry anthocyanin solution, and the residual rate of anthocyanins in the blueberry anthocyanin-graphene oxide-chitosan compound solution in dark treatment is averagely about 21.9% higher than that in the pure blueberry anthocyanin solution.

V. Study on the Stability of Blueberry Anthocyanins and the Compound with Different pH and Temperatures A blueberry anthocyanin solution with a mass concentration of 1 mg/mL and a blueberry anthocyanin-graphene oxide-chitosan compound solution with a mass concentration of 1 mg/mL were prepared. The solutions with pH of 1.0, 2.0, 3.0, 4.0, 5.0, 6.0 and 7.0 were respectively prepared by adjusting pH with 2 mol/L of hydrochloric acid and 2 mol/L of sodium hydroxide solution. The solutions were respectively placed in thermostat water baths at 40° C., 50° C., 60° C., 70° C., 80° C. and 90° C. to heat for 4 hours away from light. The anthocyanin contents of 7 groups were determined every 1 hour. FIGS. 13 to 26 show the anthocyanin contents in blueberry anthocyanin-graphene oxide-chitosan compound solutions treated with different pH and temperatures. Blueberry anthocyanins in solutions with different pH are degraded to varying degrees with the change of heating intensity and heating time. With the extension of heating time, the anthocyanin content decreases. The higher the temperature, the faster the degradation. When the temperature is low, anthocyanin degrades slowly with the extension of heating time. When the temperature reaches 90° C., anthocyanin degradation is significantly higher than at other temperatures. Anthocyanin is stable at pH 3.0 and pH 4.0. When heated at 40° C. for 4 hours, the residual rates of anthocyanins in blueberry anthocyanin solutions with pH 1.0 to 7.0 are 75.3%, 80.2%, 89.9%, 89.0%, 71.6%, 60.4%, and 50% respectively. When heated at 40° C. for 4 hours, the residual rates of anthocyanins in blueberry anthocyanin-graphene oxide-chitosan compound solutions with pH 1.0 to 7.0 are 80.7%, 82.1%, 90.3%, 91.9%, 79.4%, 74.8%, and 57% respectively. When heated at 90° C. for 4 hours, the residual rates of anthocyanins in blueberry anthocyanin solutions with pH 1.0 to 7.0 are 20.4%, 25.0%, 30.7%, 28.3%, 21.4%, 15.9%, and 9.0% respectively. When heated at 90° C. for 4 hours, the residual rates of anthocyanins in blueberry anthocyanin-graphene oxide-chitosan compound solutions with pH 1.0 to 7.0 are 29.5%, 30.0%, 36.7%, 32.4%, 30.8%, 20.3%, and 17% respectively. It is obvious that the anthocyanin content in the blueberry anthocyanin-grapheneoxide-chitosan compound solution is significantly higher than that in the blueberry anthocyanin solution, indicating that graphene oxide combined with chitosan compound has protective effect on anthocyanins.

The invention claimed is:
1. A method for preparing high stability a liquid blueberry anthocyanin, comprising the following processing steps:
   step 1, adding graphene oxide and chitosan into an (2-n-morpholine) ethanesulfonic acid (MES) buffer solution at room temperature and mixing evenly to form a mixture, and adding (1-(3-dimethylaminopropyl)-3-ethylcarbondiimide hydrochloride (EDC) and (N-hydroxysuccinmide (NHS) in the first mixture to obtain a first solution;

step 2, adding dry blueberry anthocyanin powder into the first solution, adjusting pH to 4.5 to 5.0 and mixing evenly, obtaining a second solution; and step 3, treating the second solution under 350 to 420 MPa at 2 to 4° C. to obtain the liquid blueberry anthocyanins.

2. The method according to claim 1, wherein step 1 is carried out at room temperature under ultrasonic treating for 4 to 8 hours and stirring for 15 to 18 hours with a rotational speed of 700 to 1400 r/min.

3. The method according to claim 1, wherein step 2 is carried out under ultrasonic treating for at least 30 minutes after adjusting pH to 4.5 to 5.0, stirring for 10 to 14 hours with a rotational speed of 700 to 1400 r/min to mix evenly to obtain the second solution.

4. The method according to claim 1, wherein in step 3, a treating time is 5 to 15 minutes.

5. The method according to claim 1, wherein in step 1, a mass ratio of graphene oxide to chitosan ranges from 1:1 to 1:5.

6. The method according to claim 1, wherein in step 1, a ratio of graphene oxide to MES buffer solution ranges from (0.1 g to 0.3 g):100 mL.

7. The method according to claim 1, wherein in step 1, a mass ratio of graphene oxide to EDC ranges from 1:6 to 1:7, and a mass ratio of graphene oxide to NHS ranges from 1:7 to 1:8.

8. The method according to claim 7, wherein in step 1, a mass ratio of graphene oxide to EDC is 1:6.5, and a mass ratio of graphene oxide to NHS is 1:7.8.

9. The method according to claim 1, wherein in step 2, a mass ratio of dry blueberry anthocyanin powder to the first solution ranges from 1:100 to 3:100.

* * * * *